(12) United States Patent
Cox et al.

(10) Patent No.: US 11,489,928 B2
(45) Date of Patent: Nov. 1, 2022

(54) PRIORITIZATION OF PROCESSES BASED ON USER PERSONA AND REINFORCEMENT LEARNING

(71) Applicant: Dell Products L.P., Round Rock, TX (US)

(72) Inventors: Tyler Ryan Cox, Austin, TX (US); Nikhil Manohar Vichare, Austin, TX (US); Marc Randall Hammons, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 16/774,836

(22) Filed: Jan. 28, 2020

(65) Prior Publication Data
US 2021/0234938 A1    Jul. 29, 2021

(51) Int. Cl.
*H04L 67/306* (2022.01)
*H04M 1/72448* (2021.01)
*H04L 67/50* (2022.01)

(52) U.S. Cl.
CPC .......... *H04L 67/306* (2013.01); *H04L 67/535* (2022.05); *H04M 1/72448* (2021.01)

(58) Field of Classification Search
CPC ... H04L 67/306; H04L 67/22; H04M 1/72448
See application file for complete search history.

(56) References Cited

U.S. PATENT DOCUMENTS

| | | | |
|---|---|---|---|
| 7,996,842 B2 | 8/2011 | Savit | |
| 8,655,307 B1* | 2/2014 | Walker | H04W 68/005 455/405 |
| 9,405,585 B2 | 8/2016 | Chess et al. | |
| 9,781,542 B2* | 10/2017 | Rangarajan | H04W 52/0258 |
| 2013/0246595 A1* | 9/2013 | O'Donoghue | G06Q 30/02 709/223 |
| 2019/0220319 A1 | 7/2019 | Parees et al. | |
| 2019/0305383 A1* | 10/2019 | Muntes | H01M 10/425 |
| 2020/0336398 A1* | 10/2020 | Thomas | H04L 41/20 |

* cited by examiner

*Primary Examiner* — Jaime M Holliday
(74) *Attorney, Agent, or Firm* — Norton Rose Fulbright US LLP (57) ABSTRACT

Settings on an information handling system may be adjusted to set priority levels for processes executing on the information handling system in view of desired operational characteristics of the information handling system for a user persona and in view of expected future events for the information handling system. A score may be generated based on a user persona (e.g., whether a user is a light gamer, heavy gamer, corridor warrior, or desk worker) and expected future computer contexts (e.g., an expectation that a user will play a game in one hour). That score may be used to determine policies (e.g., high performance, balanced, or battery saver) to implement through settings on the computer system. Consideration of user persona classifications, associated group behaviors, and dynamic system contexts (including resource extremas, location, temporal context, and predicted future events) improve use of system resources through prioritization and governing of diverse optimization methods.

20 Claims, 10 Drawing Sheets

PRIORITIZATION OF PROCESSES BASED ON USER PERSONA AND REINFORCEMENT LEARNING

FIELD OF THE DISCLOSURE

The instant disclosure relates to performance enhancement of information handling systems. More specifically, portions of this disclosure relate to automated prioritization adjustment for information handling system processes.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may execute multiple system processes concurrently. For example, users may run multiple applications, such as gaming applications, productivity applications, system applications, video streaming applications, communications applications, and other applications, simultaneously, and each application may include multiple associated system processes. Different processes may require allocation of different amounts of resources. Allowing processes that are unimportant to a user to consume resources and/or starving processes that are important to a user of needed resources can negatively impact a user experience. For example, starving important processes of resources can cause decreases in frame rate, network lagging, application crashes, and other negative events.

In some cases, users may manually prioritize certain processes and/or applications, configuring an information handling system to prioritize allocating resources to specific applications or processes that a user deems important. However, manual prioritization can be time consuming and may require a level of technical knowledge that users may not possess. Furthermore, such prioritization may require a user to frequently interact with a prioritization user interface to adjust priorities as usage needs change. In other cases, processes and/or applications may be automatically prioritized based on resource consumption, such that processes that consume substantial system resources are prioritized over those that do not, or based on a designation of processes as foreground and background processes, such that foreground processes are prioritized over background processes. Such prioritization, however, may negatively impact a user experience, as processes that require minimal system resources may be more important to a user than processes that require substantial system resources, and background processes may, in some cases, be more important to a user experience than foreground processes.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Settings on an information handling system may be adjusted to set priority levels for processes executing on the information handling system in view of desired operational characteristics of the information handling system for a user persona and in view of expected future events for the information handling system. In some embodiments, a score may be generated based on a user persona (e.g., whether a user is a light gamer, heavy gamer, corridor warrior, or desk worker) and expected future computer contexts (e.g., an expectation that a user will play a game in one hour). That score may be used to determine policies (e.g., high performance, balanced, or battery saver) to implement through settings on the computer system. Consideration of user persona classifications, associated group behaviors, and dynamic system contexts (including resource extremas, location, temporal context, and predicted future events) improve use of information handling system resources through prioritization and governing of diverse optimization methods. The synthesis of a user experience score from telemetric sources to use for feedback generation can be used to continuously train personalized reinforcement learning algorithms to serve client intelligence use cases.

An optimization importance score may be calculated by weighting the values of sets of system effects relative to their impact to key performance indicators (KPIs) particular to a user based on a user's persona, that persona's KPIs, and the information handling system's system state, system history, and system context. This score provides a relative indicator to the KPIs of system components to be used in evaluating which optimization to be applied to a given system. For example, a gamer belonging to a persona of visual enthusiasts (an "Immersive Gamer") has a baseline KPI importance matrix that is weighted towards graphics quality, stable performance, low skin temperatures, and communication-optimized networking.

In some embodiments, a user experience score is determined from telemetry data to generate a closed loop on reinforcement learning systems without requiring user engagement. User experience scoring is, at a high level, the reward function for machine learning algorithms to determine whether a policy (and the resulting outcome) was desired or not. Therefore, a positive score reinforces the prediction when encountered with a similar input state, while a negative score allows the algorithm to explore other outcomes. The score may be calculated by synthesizing various telemetric features relevant to a particular outcome reached by a generated policy. The importance/relevance of an outcome is evaluated by incorporating the user's persona and system context features and incorporated into the outcome score.

For example, a reinforcement learning algorithm targeted at learning a user's system startup behaviors could use a reward function that assigned a positive score to correctly predicting which applications and files the user would open and placing them in the correct locations on screen, with a negative score being assigned for applications/files that are closed by the user without interaction or moved to a different location on the screen. Additionally, the algorithm making the prediction may not act on it to assess correctness of a generated policy. If the user manually reaches a predicted state by their own action, the model can assign a positive score to its predicted policy and predict with a higher confidence in subsequent scenarios. Further embodiment illustrations and telemetry features may be found in the subsequent material.

In one embodiment, a method may include determining a user persona based on a user's usage of the information handling system. A priority level for processes executing on the information handling system may be determined based on the user persona. Processes executed on the information handling system may be adjusted based on the determined priority level by adjusting one or more settings of the information handling system, such as through adjusting the operating system. In some embodiments, the priority levels may also be adjusted based on future expected events determined from the user's persona or telemetry data. Reinforcement learning may be applied by monitoring performance parameters of the information handling system after the adjustment and adjusting policies based on the monitored performance parameters, in which the policies are used to determine priority levels of future executing processes. An information handling system may include a memory and a processor for performing the steps described herein. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
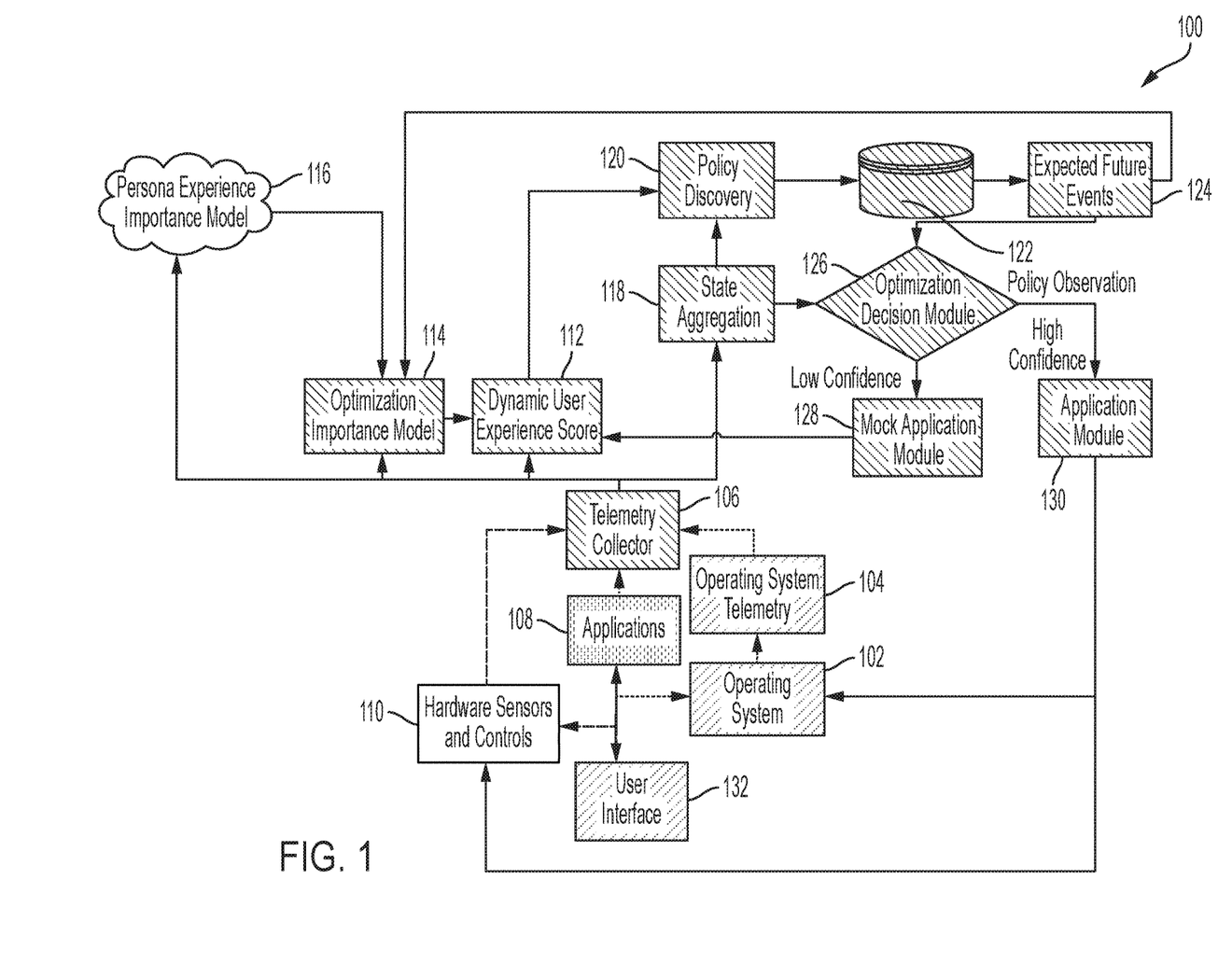
FIG. 1 is a diagram of an example information handling system with automated process prioritization, according to some embodiments of the disclosure.

An information handling system may adjust prioritization of process execution in order to enhance a user experience. For example, certain processes that are more important to a user and/or have more impact on a user experience may be prioritized over processes that are less important to the user or have less of an impact on the user experience. For example, the information handling system may devote more resources (such as processor time and/or memory space) to certain processes while devoting fewer resources to other processes. An example information handling system 100 may execute an operating system 102. The information handling system 100 may also execute one or more applications 108. The operating system 102 and the applications 108 may each execute one or more system processes. A user may interact with the applications 108 and/or the operating system 102 via a user interface 132. Hardware sensors and controls 110 of the information handling system 100 may monitor and control hardware operation of the information handling system 100. An operating system telemetry module 104 may collect telemetry data from the operating system 102. A telemetry collector 106 may collect telemetry data from the operating system telemetry module 104, the one or more applications 108, and the hardware sensors 110. The telemetry data collected by the telemetry collector 106 may be provided to a dynamic user experience score module 112 to determine a dynamic user experience score. The dynamic user experience score may provide a rating of the information handling system based on a user experience. A higher dynamic user experience score may indicate a better user experience. Telemetry data from the telemetry collector 106 may also be provided to a persona experience importance model 116 and used in determining a persona for the user of the information handling system and how different performance characteristics of the information handling system may affect users with different personas. For example, different personas may be assigned to different users based on behavior observed in the telemetry data, such as frequent gaming, offline-to-online or online-to-offline status changes, frequent use of video editing applications, and other user behaviors. The persona experience importance model 116 may rank processes executed by the information handling system, such as processes of the applications 108 and operating system 102 based on importance of the processes to a user experience of users with similar behavior patterns. The persona experience importance model 116 may be located on the information handling system 100, located in an external cloud-based system, or a combination of local and remote systems.

An optimization importance model 114 may receive persona experience importance information from the persona experience importance model 116 and telemetry data from the telemetry collector 106. The optimization importance model 114 may also receive expected future events data from an expected future events module 124. The optimization importance model 114 may determine an importance of optimization of one or more processes of the information handling system 100 and may pass the importance data to the dynamic user experience score module 112. The dynamic user experience score module 112 may pass a dynamic user experience score to a policy discovery module 120. The telemetry collector 106 may also feed telemetry data to a state aggregation module 118 which may aggregate state information for the information handling system 100. The state aggregation module 118 may feed state information to the policy discovery module 120. Based on the state information and the dynamic user experience score, the policy discovery module 120 may determine policy information and may feed the policy information to a policy observations database 122. The policy observations database 122 may feed the policy information to the expected future events module 124 which may determine one or more expected future events of the information handling system 100 based on the policy information.

State aggregation information from the state aggregation module 118 and expected future events information from the expected future events module 124 may be fed to a decision module 126. The decision module 126 may determine one or more adjustments to be performed based on the state aggregation information and the expected future events. For example, the decision module 126 may determine one or more adjustments to be performed based on a process that is determined to be a highest-ranking process by the importance model 114. The decision module 126 may make decisions with low confidence or high confidence. If an adjustment decision is made with low confidence, the decision module 126 may feed instructions to a mock application module 128. The mock application module 128 may perform a simulation of the adjustments determined by the optimization decision module 126 and feed the results of the simulation to the dynamic user experience score module 112. The dynamic user experience score module 112 may then determine if the simulation indicates that the optimization would increase or decrease the dynamic user experience score. That information may then be fed to the policy discovery module 120 and may eventually be used by the decision module 126 to determine one or more adjustments that should be made. For example, a positive result from the mock application module 128 may increase the confidence of the decision module 126 decision. If the decision module 126 decides with high confidence, the decision module may feed the adjustment to an application module 130. The application module 130 may instruct the operating system 102 and/or hardware sensors and controls 110 to make one or more adjustments based on the decision. The adjustments may include, for example, allocating additional system resources to a system process with high priority. The results of the adjustments may then be reflected in collected telemetry data and an updated dynamic user experience score. The optimization importance model 114, persona experience importance model 116, dynamic user experience score module 112, telemetry collector 106, state aggregation module 118, policy discovery module 120, policy observations database 122, expected future events module 124, decision module 126, mock application module 128, and application module 130 may all be components of a reinforcement learning system of the information handling system for improving information handling system performance in an automated manner using intelligence from previous decisions. Thus, an information handling system may dynamically adjust optimization of system processes, and the system overall, based on a dynamic user experience score, to enhance a user experience.

Figure 2:
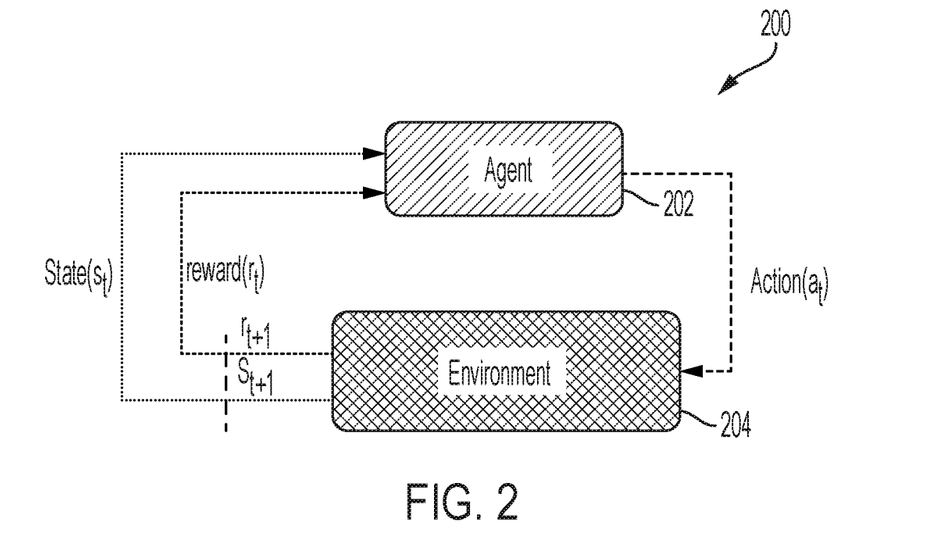
FIG. 2 is a flow diagram of an example reinforcement learning loop, according to some embodiments of the disclosure.

An information handling system may implement a reinforced learning algorithm to determine whether adjustments performed on an information handling system enhance a user experience. An example reinforcement learning loop 200 is shown in FIG. 2. The reinforcement learning loop 200 may include an environment 204 and an agent 202. The agent 202 may, for example, include one or more applications configured to monitor, configure, and communicate with applications, an operating system, firmware, and hardware of an information handling system. The environment 204 may, for example, be an operating environment of the agent 202, such as a software stack of the information handling system, which may include an embedded controller, a basic input/output system (BIOS), an operating system (OS), and applications executed by the information handling system. In some embodiments, the environment 204 may be restricted to only an OS, applications, or user-created data.

The agent 202 may monitor the environment 204 and may adjust the environment based on the monitoring to enhance performance. The agent may monitor state information, such as system power state information, such as sleep, standby, and off, performance state information, such as power profiles, overclocking data, hyper-threading data, Vsync data, caching performance data, and system settings, and repair state information of the information handling system, such as system backup information, recovery information, diagnostic test information, and SOS mode information. The agent 202 may also perform state changes, such as disabling a fast charging capability of the information handling system or reducing a top charge voltage. For example, the agent 202 may monitor a state $s_t$ at time t. The agent 202 may monitor performance parameters of the information handling system. Based on monitored state information and performance information, the agent 202 may select one or more policies to govern adjustments of the information handling system. Policies may be used to determine actions to be performed based on a current state of the information handling system to cause decisions to maximize a particular reward. Policies may, for example, include a policy for extending battery runtime, an interactive fault tolerance policy, a battery service life policy to extend a battery service lifetime, an interactive fan adjustment policy, and other policies.

The agent 202 may take one or more actions ($a_t$) that impact the environment at time t. For example, the agent 202 may adjust one or more settings of the information handling system to adjust operation of the information handling system. For example, the agent 202 may take a series of actions based on a performance improvement policy to remove applications and/or processes operating in the background of an information handling system. The agent 202 may turn off non-essential hardware components based on a battery maximization policy. Agents may also be configured to record backup data and accept or reject driver updates. Actions may include adjustments to system hardware settings such as fan speed, screen brightness, speaker volume, and Bluetooth settings, adjustment to application settings, such as removing an application from automatic execution at startup and enabling or disabling notifications, and OS settings, such as adjustments to sizes and locations of page files and application or rejection of updates to the OS.

After adjusting settings, the agent 202 may monitor the environment 204 to determine if the adjustments improved performance (e.g., responsiveness, frame rate, lower processor utilization, more processor time available for a top-ranked process, lower processor temperature, longer battery life, etc.) of the information handling system. If the adjustments did improve performance, the agent 202 may calculate a reward, increasing prioritization of such adjustments in the future. If the adjustments reduced performance, the agent 202 may calculate a negative reward, deprioritizing such adjustments in the future. The reward may be a metric used to determine the success or failure of the agent's action. As one example, if the agent 202 reduces screen brightness to improve battery life and a user overrides the change to increase brightness, a calculated reward may be negative. For example, the reward $r_{t+1}$ may be calculated at time t+1 when a state $s_{t+1}$ is observed in the environment 204. Various factors can be considered in determining whether the adjustments enhanced performance of the information handling system, such as a user experience, performance statistics of the information handling system, security of the information handling system, and management of a health of the information handling system. The reinforcement learning algorithm may learn from user interactions with the information handling system and performance of the information handling system and may adapt continuously to a changing environment. Such operation may provide advantages over a supervised labelled data environment, such as reduced expense, applicability to specific problem areas, and enhanced responsiveness to user feedback. A reinforcement learning algorithm may be applied to an information handling system to determine processes that should be prioritized and settings adjustments that should be made based on the process prioritization.

Figure 3:
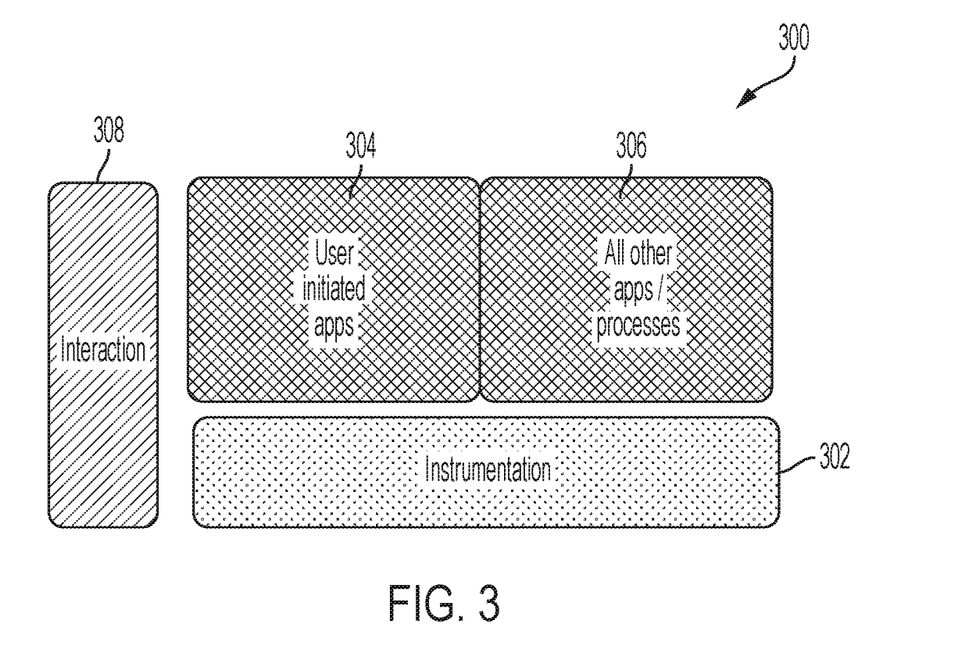
FIG. 3 is a diagram of an example user environment of an information handling system according to some embodiments of the disclosure.

An information handling system user environment 300, shown in FIG. 3, may include multiple components. For example, the user environment 300 may include user-initiated applications 304, which may each include multiple processes. The information handling system may, by default, prioritized user-initiated applications 304 and associated processes. The user environment 300 may also include other applications and processes 306 that were not user initiated. The user environment 300 may also include instrumentation 302 for measuring one or more parameters, such as internal performance statistics, associated with the information handling system and for monitoring user interaction 308 with the user environment 300.

An information handling system may prioritize one or more processes being executed by the information handling system and may adjust one or more settings of the information handling system associated with the processes to optimize operation of the information handling system. The reinforcement learning system described with reference to FIG. 1, FIG. 2, and FIG. 3 may be used in the training of a model for prioritization based on user persona as described in the embodiments below.

Figure 4:
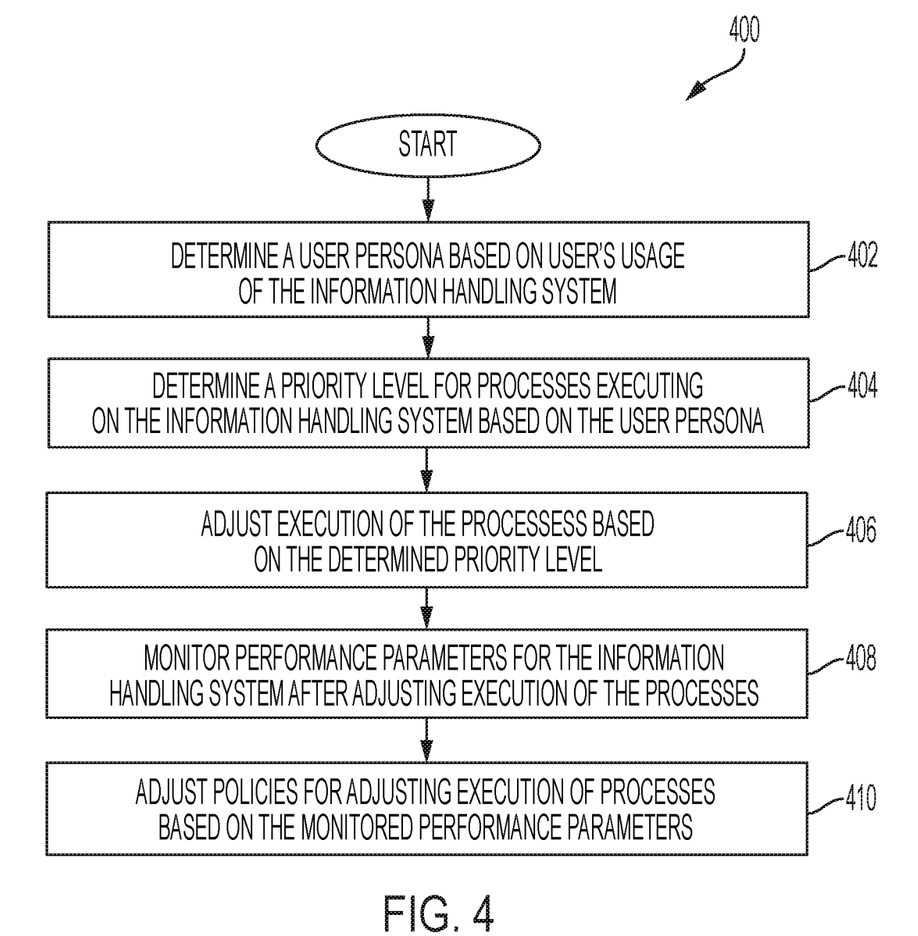
FIG. 4 is a flow chart illustrating an example method for adjusting operation of an information handling system based on a user persona with reinforcement learning according to some embodiments of the disclosure.

A method of prioritizing processes for execution on an information handling system may be performed based on a user persona that characterizes the manner in which the user uses the information handling system. FIG. 4 is a flow chart illustrating an example method for adjusting operation of an information handling system based on a user persona with reinforcement learning according to some embodiments of the disclosure. A method 400 includes, at block 402, determining a user persona for a user based on the user's usage of the information handling system. Examples of user personas include corridor warrior, light gamer, and immersive gamer. Next, one or more settings of the information handling system associated with executing one or more processes based, at least in part, on the expected future event and the user persona. For example, priority levels for processes executing on the information handling system may be determined based on the user persona. In one example application, a user persona of "immersive gamer" may result in prioritization of foreground gaming processes over other processes. As another example, a user persona of corridor warrior may result in reduction in prioritization of processes to reduce battery consumption. The prioritization may also be based on location context. For example, a corridor warrior in the office may have less reduction in prioritization based on the availability of a power supply than a corridor warrior in a conference room where no power supply is connected. At block 406, the information handling system implements the prioritizations on the processes, such as by modifying parameters in an operating system executing on the information handling system.

Changes in performance of the information handling system in response to the user persona adjustments to prioritization may be used in a reinforced learning system to improve operation of the information handling system. For example, the method 400 may continue to block 408 with monitoring performance parameters for the information handling system after adjusting execution of the processes based on the user persona. Then, at block 410, policies that are applied to adjust execution based on the user persona may be adjusted to reflect the success or failure at improving performance of the information handling system.

Figure 5:
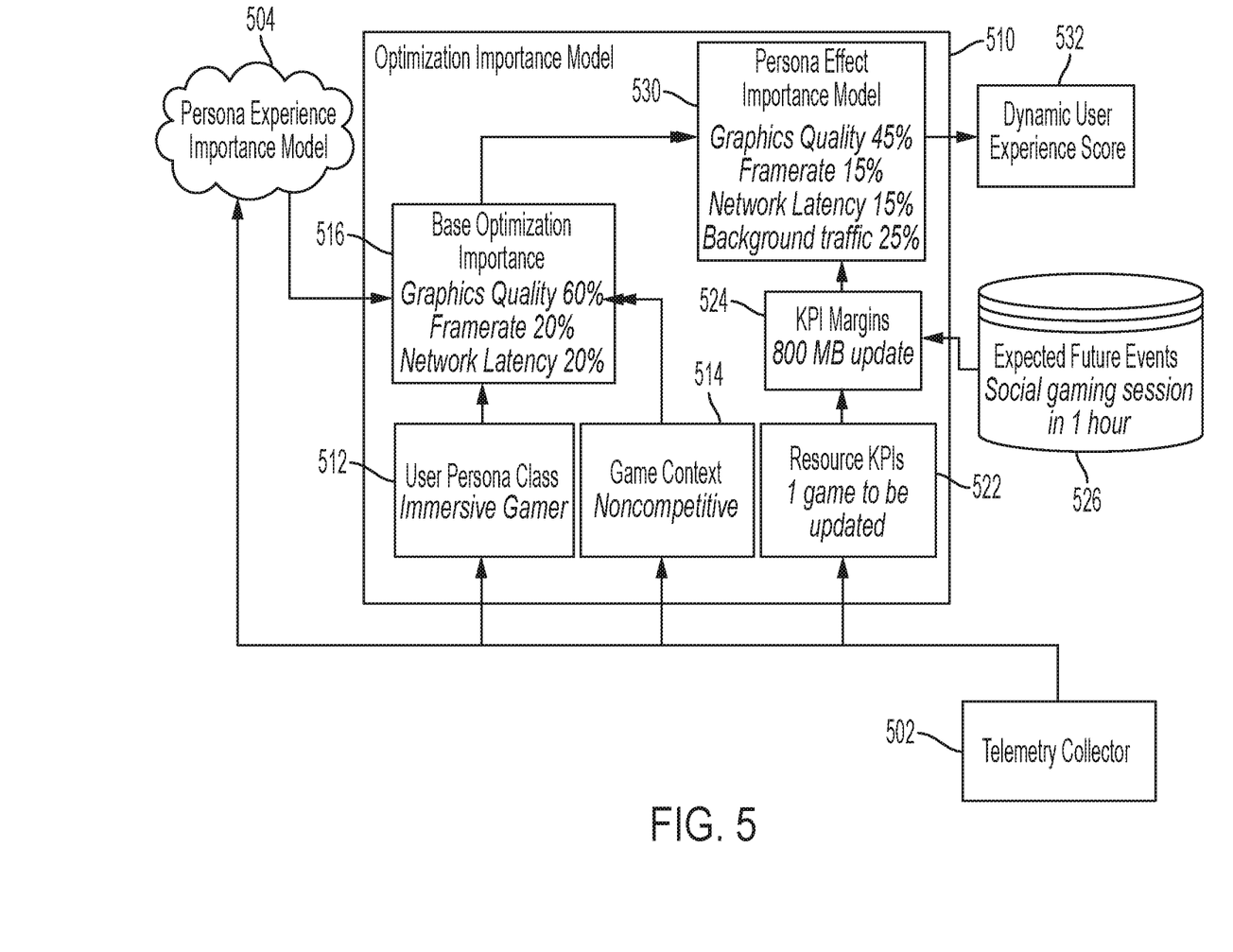
FIG. 5 is a block diagram illustrating the application of a user persona to operation of an information handling system according to some embodiments of the disclosure.

The prioritization of processes may be determined based on an optimization importance model that is based on the user persona class. That model may be based on the user persona and other factors, such as game context, location context, what processes are currently executing on the information handling system, and what future events are expected to occur on the information handling system. FIG. 5 is a block diagram illustrating the application of a user persona to operation of an information handling system according to some embodiments of the disclosure. Telemetry collector 502 obtains telemetry data that includes information about how the user uses the information handling system and/or how other users use other information handling systems. The telemetry data is used to determine a user persona 512 for the user and a context 514 for the current use of the information handling system. The user persona 512 and context 514 are used to determine a base optimization importance 516, informed by a persona experience importance model 504. The model 504 may be generated based on the telemetry data from telemetry collector. In some embodiments, the model 504 is generated on a remote server and retrieved for storage on a local information handling system. The base optimization importance 516 may specify policies for operating the information handling system. For example, for an "immersive gamer" that executes full-screen resource-intensive applications the base optimization importance 516 may set a policy with a graphics quality importance of 60%, a framerate importance of 20%, and a network latency importance of 20%.

The optimization importance model 510 may also take into consideration other processes executing on the information handling system. For example, a resource KPI 522 may specify that a game is waiting to be updated in the background, and a KPI margin 524 may indicate the update is 800 MB is size. An expected future event 526 for the information handling system may indicate that a social gaming session will begin in approximately one hour. Blocks 522, 524, and 526 may feed into a persona effect importance model 530 that modifies a policy from the base optimization importance 516. In the illustrated example, the modified policy may set an importance of graphics quality to 45%, a framerate importance to 15%, a network latency importance to 15%, and a background traffic importance to 25%. By increasing an importance of the background traffic importance relative to other processes, the update to the game is allowed to occur despite the importance to the immersive gamer of graphics quality because there is an expected future event requiring the game to be updated within one hour. The persona effect importance model 530 may be used to generate a dynamic user experience score 532.

Figure 6:
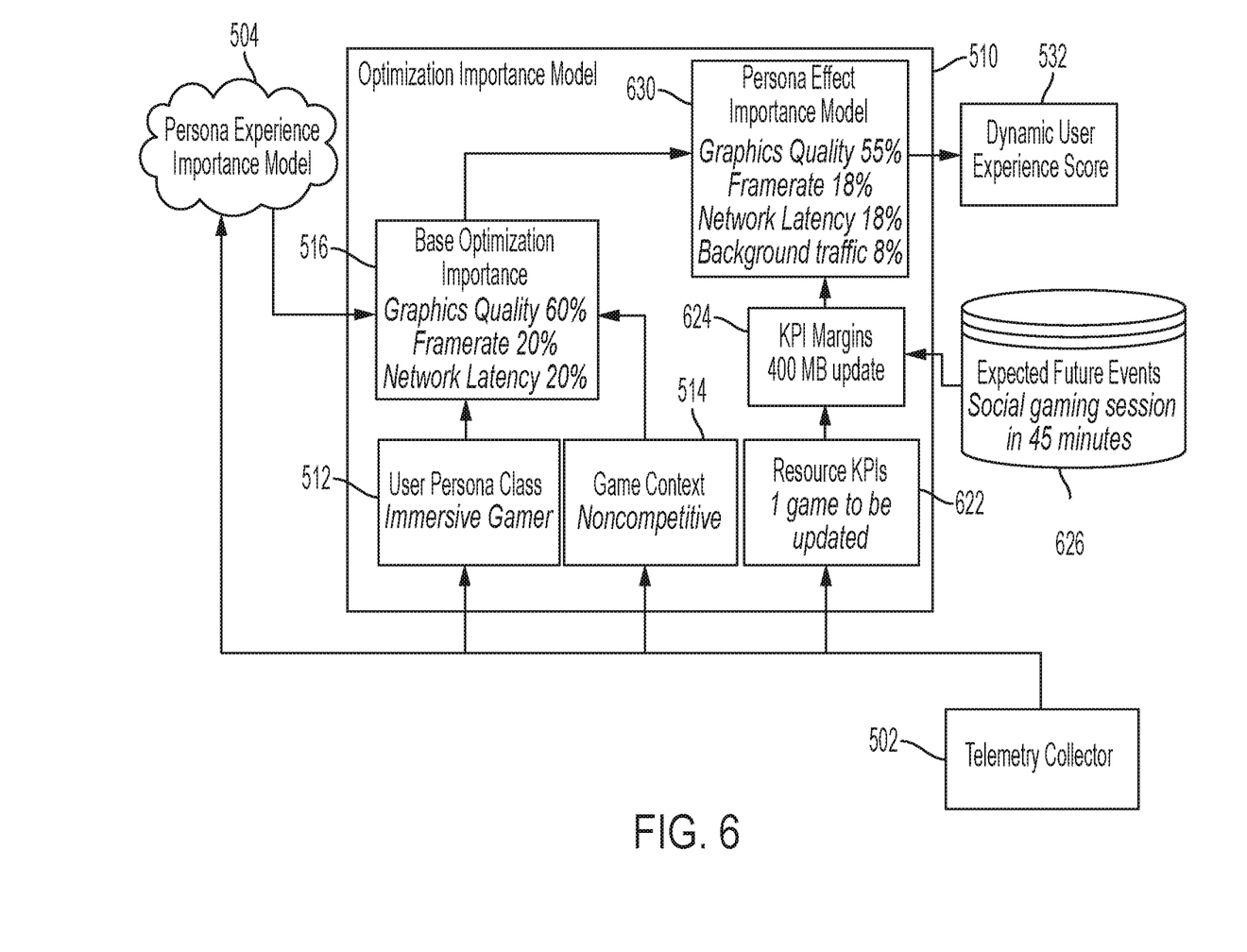
FIG. 6 is a block diagram illustrating a modification of a persona effect importance model according to some embodiments of the disclosure.

As processes and importance levels change on an information handling system, the person effect importance model may be updated by further modifying the policy of the base optimization importance 516. FIG. 6 is a block diagram illustrating a modification of a persona effect importance model according to some embodiments of the disclosure. The illustrated example of FIG. 6 is similar to that of FIG. 5 but fifteen minutes of time have elapsed, and 400 MB of the game update have been downloaded. The optimization importance model 516 may determine that the KPI margin 624 has decreased and there is sufficient time to complete the update before the expected future event. Thus, the persona effect importance model 630 may be set by modifying the base optimization importance 516 to have a lower background traffic importance than that shown in FIG. 5. For example, the persona effect importance model 630 may have a graphics quality importance of 55%, a framerate importance of 18%, a network latency importance of 18%, and a background traffic importance of 8%. In both FIG. 5 and FIG. 6, the game context indicated the game was non-competitive. However, if the game context was competitive, the optimization importance model 516 may prioritize the graphics quality over the background traffic because a competitive game is more important than an update for a social gaming session. The relative importance based on context may be set through the persona experience importance model 504 based on telemetry data collected from information handling systems indicating how much an importance level can be changed for a particular hardware configuration of an information handling system without affecting the graphics quality.

Figure 7:
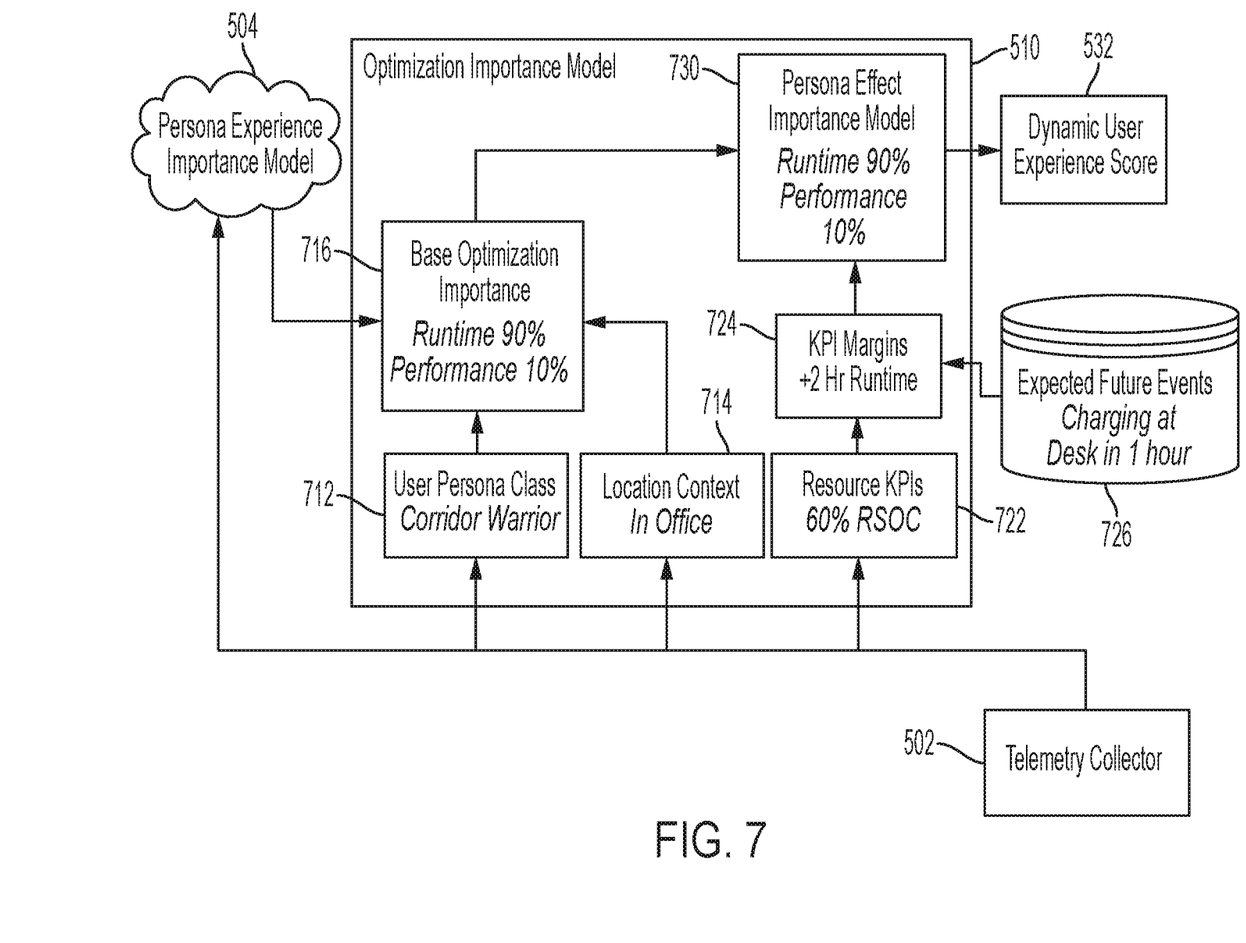
FIG. 7 is a block diagram illustrating another user persona class according to some embodiments of the disclosure.

Another example of adjusting importance levels for processes on an information handling system based on user persona is shown in FIG. 7. FIG. 7 is a block diagram illustrating another user persona class according to some embodiments of the disclosure. Another user persona 712 determined from the telemetry data may be a "corridor warrior," referring to a user that works in an office but attends frequent meetings requiring short periods out of the office without an available external power source. An expected future event for such a user may indicate an amount of time until the information handling system is back at a desk for charging. For example, an expected future event 726 is charging of the information handling system at a desk in approximately one hour. Based on that event, a KPI margin 724 is set at 2 hours of runtime, indicating that the battery should last at least two hours to allow the information handling system to operate until returning to the desk with some safety margin. A base optimization importance 716 for a corridor warrior, determined from the model 504, may be to set an importance level of runtime duration at 90% and an importance level for performance at 10%, thus indicating a high preference for operating the information handling system to ensure a desired runtime duration (in this example 2 hours). Based on determined KPI margin 724, the information handling system may determine that no modification to the base optimization importance 716 is needed because the hardware's available battery reserve is sufficient to ensure the desired runtime duration. Thus, the persona effect importance model 730 is equal to the base optimization importance 716.

A user belonging to a persona of mobile productivity workers (a "Corridor Warrior"), such as demonstrated in FIG. 7, has a baseline KPI importance matrix that is weighted towards fast battery charging, responsive compute tuning, low skin temperatures, communication-optimized networking, and standard office display brightness settings. Additionally, their system state shows medium relative state of charge (RSoC) and absolute state of charge (ASoC) battery levels, communication activity, and office ambient light. The system context further details that the user is in their nominal use environment (a corporate office) and has a 200% battery runtime margin until the next expected charging time (based on history and calendar events). The system is prioritizing a battery runtime optimization policy. Then, the user starts up a moderate utilization program and shares the window via their communication session. The system now has an option to start dynamically optimizing the application by allocating more thermal headroom and reducing runtime optimization levels due to the surplus in expected runtime before the next expected charge event. Based on the importance of communication traffic to the user and the context of the other system resources, the system balances the performance optimizations for the communication activity, stepping the runtime optimization policy down, resulting in a half hour loss in expected runtime but still maintaining margin to the next expected charge event.

Figure 8:
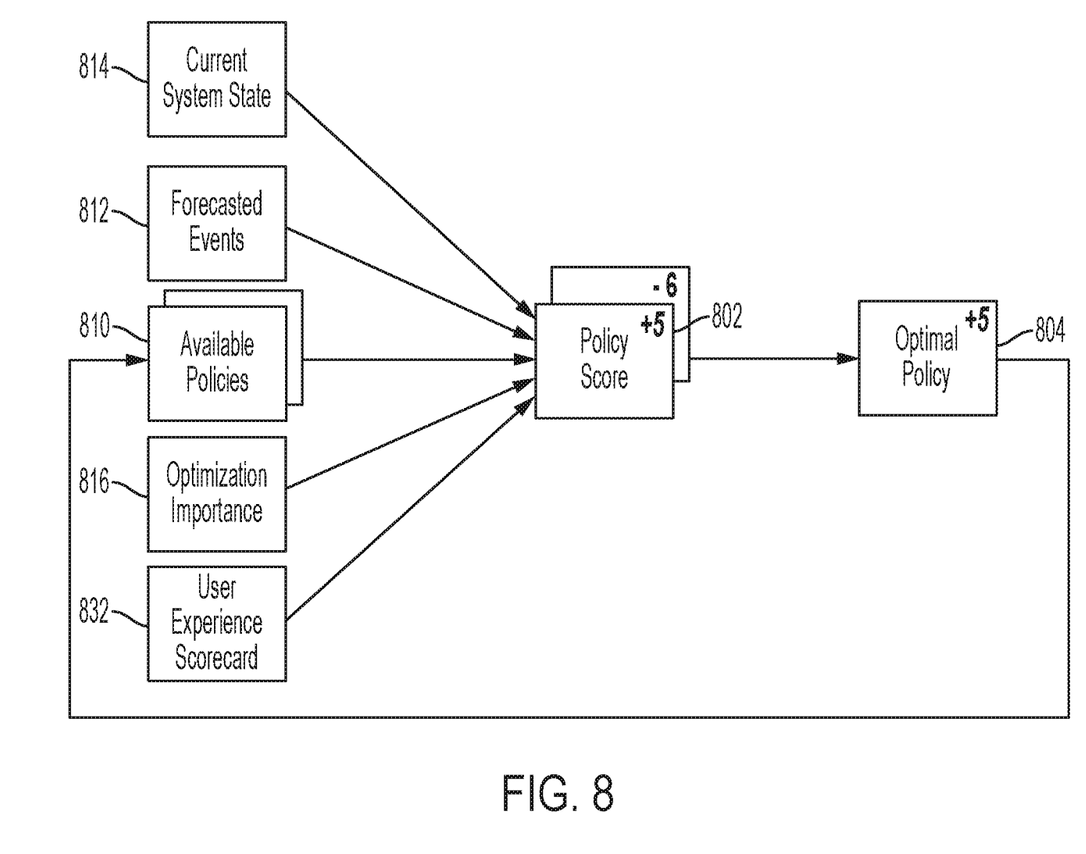
FIG. 8 is a block diagram illustrating a generation of a policy score according to embodiments of the disclosure.

FIG. 8 is a block diagram illustrating a generation of a policy score according to embodiments of the disclosure. Several factors may be used to determine an optimal policy for implementation on an information handling system when multiple policies are available as candidates. Policy scores 802 may be generated corresponding to a set of available policies 810. The scores may be based on a current system state 814, forecasted events 812, optimization importance levels 816, and a user experience scorecard 832. Each of the policy scores 802 may be weighted and used to arrive at an optimal policy 804, in which "optimal" refers to a policy with the best usage of system resources in view of the information available at the time regardless of whether other policies may perform better based on unforeseen circumstances. The determined optimal policy may be provided as feedback to the available policies 810. The available policies 810 may be adjusted over time as the feedback system trains using additional circumstances.

Figure 9:
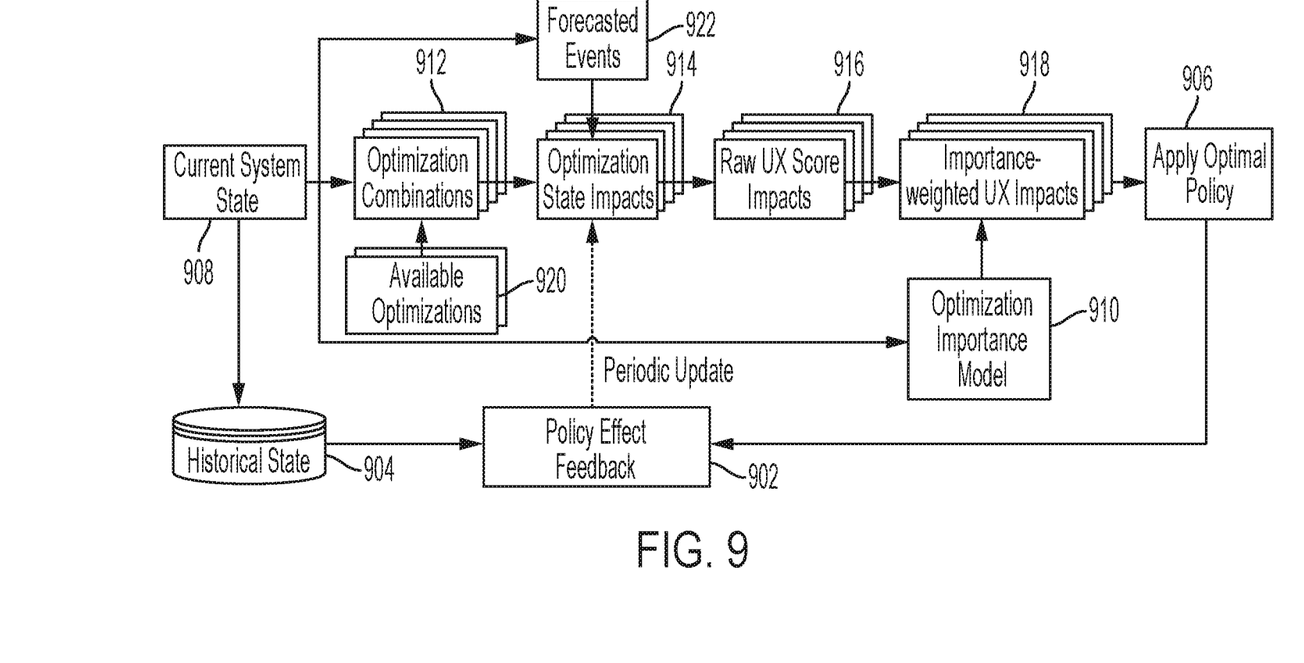
FIG. 9 is a block diagram illustrating a process for reinforcement learning of policies according to some embodiments of the disclosure.

FIG. 9 is a block diagram illustrating a process for reinforcement learning of policies according to some embodiments of the disclosure. A dataset of historical states for information handling systems 904 is generated over time from a current system state 908. The historical state dataset 904 is used in applying feedback to policies at block 902, in combination with determined optimal policies 906. The feedback 902 is applied, such as through periodic updates, to optimization states 914. The optimal policy 906 may be determined for a current system state 908 by examining available optimizations 920 and selecting particular optimization combinations 912. The state impact 914 of those optimization combinations 912 in view of forecasted events 922 is determined, and a raw user experience score impacts 916 calculated. The raw user experience score impacts 916 may be importance-weighted at block 918, such as based on an optimization importance model 910 that includes a user persona, such as that shown in FIG. 5.

The experience score reflects experiences that the user prefers more when there are multiple experiences that could be optimized. For example, when there is a trade-off between higher performance with longer battery life, a user may prefer high performance given current and predicted tasks. The user experience score may rank performance over long battery runtime. The Reinforcement Learning (RL) framework described above, such as with respect to FIG. 1, FIG. 2, and/or FIG. 3, may generate a candidate score based on how the user is using the information handling system and the choices made by the user over time. After an initial period of learning, the reinforcement learning system may begin making choices for the user. If the choices are incorrect then the reinforcement learning penalizes the choices. In some embodiments, the reinforcement learning may be trained externally on a simulator to initialize a default experience scoring policy. The user experience score 918 may be a numerical output of the combination of candidate policies 912, resulting system state impact projections 914 (e.g., incorporating impacts 916 forecasted event likelihoods 912), weighted by optimization importance models 910 (such as calculated at block 730). The user experience score may be used as a metric used for determining the optimal policy at each decision point.

Figure 10:
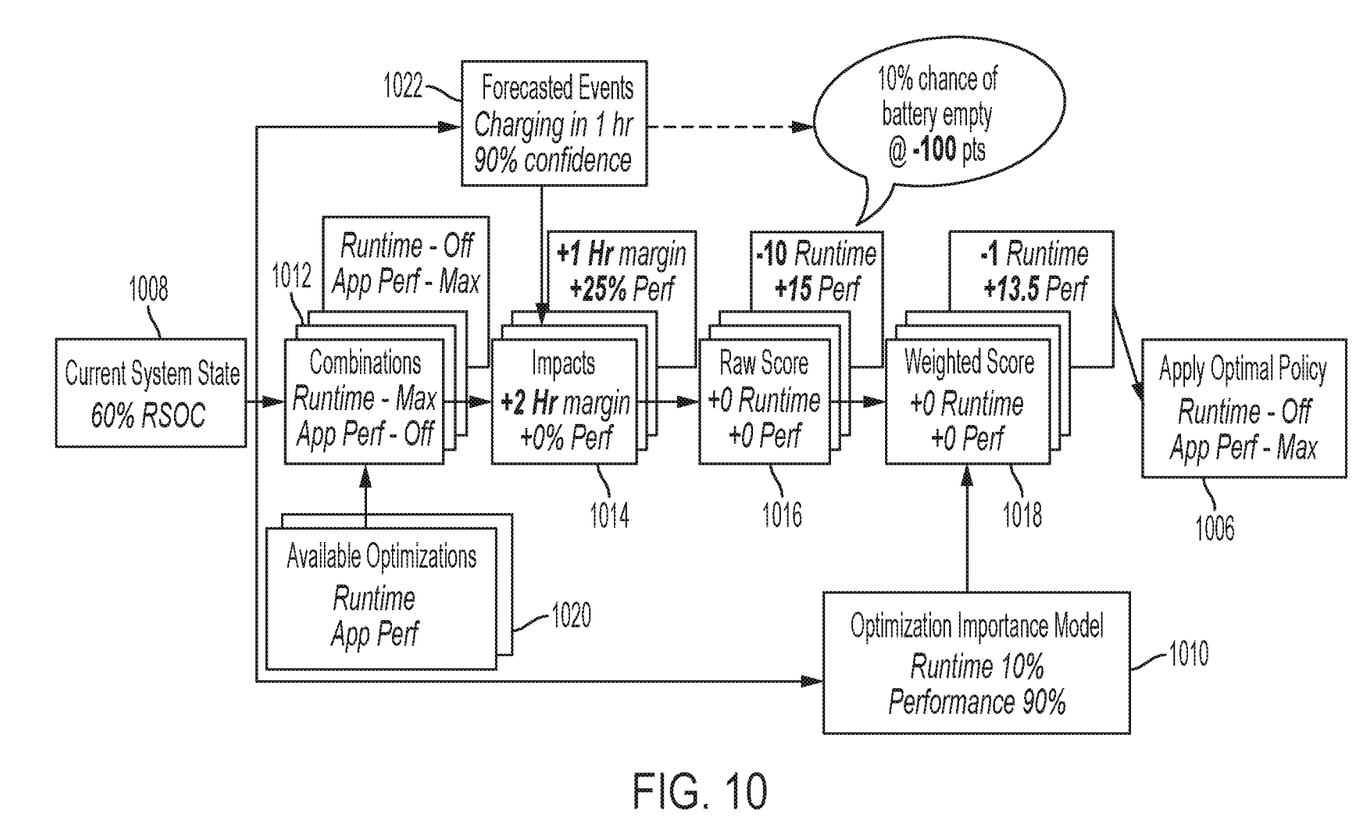
FIG. 10 is a block diagram illustrating an example determination of a policy according to some embodiments of the disclosure.

An example of the operation in FIG. 9 for one example case is shown in FIG. 10. FIG. 10 is a block diagram illustrating an example determination of a policy according to some embodiments of the disclosure. A current system state 1008 indicates a 60% RSOC battery level. Available optimizations 1020 include runtime duration and application performance, and combinations 1012 of those optimizations 1020 include maximizing runtime or maximizing application performance. A forecasted event 1022 indicates a 90% confidence in access to a charging power supply in one hour. The impacts to runtime and performance are determined for the combinations 1012 to determine that maximizing runtime would provide a 2-hour margin in runtime and that maximizing performance would increase application performance by 25% at the cost of only having a 1-hour margin in runtime. The impacts 1014 are used to determine raw scores 1016. For example, the maximum performance optimization combination may receive a score of −10 indicating a 10% chance of empty battery (which is a −100 score) with a score of +15 for the increase in application performance. As another example, the maximum runtime optimization combination may receive a score of zero, which includes a zero for runtime score for having no likelihood of emptying the battery and a zero-performance score for not increasing performance of the applications. The raw scores 1016 may be weighted 1018 based on an optimization importance model 1010. For example, the model 1010 may specify a runtime importance of 10% and a performance importance of 90%, such that the −10-runtime penalty is weighted to a −1-runtime penalty and such that the +15-performance increase is weighted to a +13.5 performance increase. An optimal policy 1006 may be determined that selects a maximum application performance.

Figure 11:
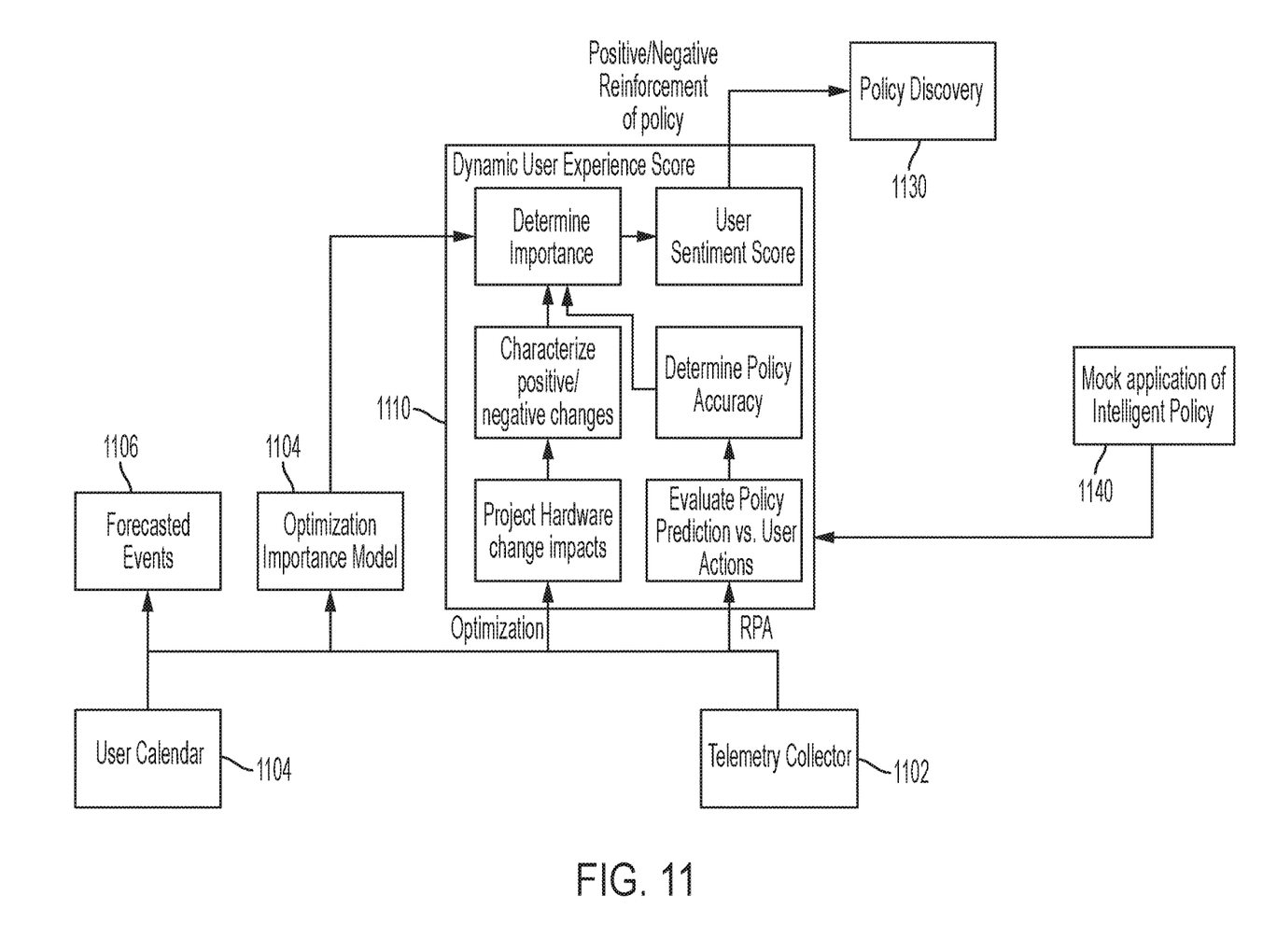
FIG. 11 is a block diagram illustrating a process for reinforcement learning of policies according to some embodiments of the disclosure.

Another example of the reinforcement learning process is shown in FIG. 11. FIG. 11 is a block diagram illustrating a process for reinforcement learning of policies according to some embodiments of the disclosure. A user calendar 1104 may be used to forecast events 1106, along with telemetry data from telemetry collector 1102. The telemetry data may also be used to determine an optimization importance model 1104, such as described above with reference to FIG. 5. The telemetry data may further be used for optimization and reinforcement in a dynamic user experience scoring process 1110. The telemetry data may be used to project hardware change impacts, and how those changes positively/negatively change the user experience. The telemetry data may also be used to evaluate policy predictions against user actions to determine policy accuracy. An importance of various changes may be determined from the policy accuracy and the projected hardware change impacts to generate a user sentiment score indicating whether the user was satisfied with the performance of the information handling system. The sentiment score may be used for positive or negative reinforcement of an available set of policies, and those policies adjusted based on the reinforcement. In some embodiments, a mock application 1140 of the policies may be used to evaluate policies and used alone or in combination with real-world application of the policies for reinforcement learning.

The flow chart diagram of FIG. 4 is generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method, comprising:
   determining, by an information handling system, a user persona of a user of the information handling system, wherein the user persona is based, at least in part, on data regarding usage by the user of the information handling system;
   determining an expected future event and an expected time of the expected future event for the information handling system;
   determining a score based, at least in part, on the expected future event, the time of the expected future event, and the user persona;
   adjusting one or more settings of the information handling system to prioritize execution of one or more processes based, at least in part, on the score; and
   adjusting execution of the one or more processes based, at least in part, on the one or more settings.

2. The method of claim 1, wherein the step of determining the user persona comprises determining the user persona based, at least in part, on telemetry data comprising: the data regarding the usage of the information handling system; and other user's usage of other information handling systems.

3. The method of claim 1, wherein the step of adjusting one or more settings of the information handling system comprises:
   setting one or more base optimization importance levels based, at least in part, on the user persona; and
   modifying the one or more base optimization importance levels based, at least in part, on a dynamic context of the one or more processes to generate a persona effect importance model, wherein the one or more settings for the one or more processes is based, at least in part, on the persona effect importance model.

4. The method of claim 3, wherein the step of adjusting one or more settings of the information handling system comprises:
   determining a policy from a set of available policies corresponding to the user persona; and
   modifying the policy based, at least in part, on the persona effect importance model.

5. The method of claim 4, wherein the step of modifying the policy comprises:
   monitoring one or more performance parameters of the information handling system; and
   adjusting the policy based, at least in part, on feedback from monitoring the one or more performance parameters.

6. The method of claim 1, further comprising:
   monitoring one or more performance parameters of the information handling system following the adjustment of the one or more settings of the information handling system associated with a first process; and
   adjusting the one or more settings of the information handling system based on feedback from monitoring the one or more performance parameters.

7. The method of claim 6, wherein monitoring one or more performance parameters comprises monitoring user actions taken following the adjustment of the one or more settings of the information handling system associated with the first process.

8. The method of claim 1, further comprising weighting the score relative to a values of sets of system impact to key performance indicators (KPIs).

9. The method of claim 1, further comprising determining the score at a point in time based on at least one of: a current system state, telemetry, an optimization importance levels, or a user experience scorecard.

10. The method of claim 1, further comprising providing feedback from a user experience to adjust the score.

11. An information handling system comprising:
    a processor; and
    a memory;
    wherein the processor is configured to perform steps comprising:
       determining, by an information handling system, a user persona of a user of the information handling system, wherein the user persona is based, at least in part, on data regarding usage by the user of the information handling system;

determining an expected future event and an expected time of the expected future event for the information handling system;

determining a score based, at least in part, on the expected future event, the time of the expected future event, and the user persona;

adjusting one or more settings of the information handling system to prioritize execution of one or more processes based, at least in part, on the score; and adjusting execution of the one or more processes based, at least in part, on the one or more settings.

12. The information handling system of claim 11, wherein the step of determining the user persona comprises determining the user persona based, at least in part, on telemetry data comprising: the data regarding the usage of the information handling system; and other user's usage of other information handling systems.

13. The information handling system of claim 11, wherein the step of adjusting one or more settings of the information handling system comprises:

setting one or more base optimization importance levels based, at least in part, on the user persona; and modifying the one or more base optimization importance levels based, at least in part, on a dynamic context of the one or more processes to generate a persona effect importance model, wherein the one or more settings for the one or more processes is based, at least in part, on the persona effect importance model.

14. The information handling system of claim 13, wherein the step of adjusting one or more settings of the information handling system comprises:

determining a policy from a set of available policies corresponding to the user persona; and modifying the policy based, at least in part, on the persona effect importance model.

15. The information handling system of claim 14, wherein the step of modifying the policy comprises:

monitoring one or more performance parameters of the information handling system; and adjusting the policy based, at least in part, on feedback from monitoring the one or more performance parameters.

16. The information handling system of claim 11, wherein the processor is configured to perform steps comprising:

monitoring one or more performance parameters of the information handling system following the adjustment of the one or more settings of the information handling system associated with a first process; and adjusting the one or more settings of the information handling system based on feedback from monitoring the one or more performance parameters.

17. A computer program product, comprising:

a non-transitory computer readable medium comprising instructions for causing an information handling system to perform steps comprising:

determining, by an information handling system, a user persona of a user of the information handling system, wherein the user persona is based, at least in part, on data regarding usage by the user of the information handling system;

determining an expected future event and an expected time of the expected future event for the information handling system;

determining a score based, at least in part, on the expected future event, the time of the expected future event, and the user persona;

adjusting one or more settings of the information handling system to prioritize execution of one or more processes based, at least in part, on the score; and adjusting execution of the one or more processes based, at least in part, on the one or more settings.

18. The computer program product of claim 17, wherein the step of determining the user persona comprises determining the user persona based, at least in part, on telemetry data comprising: the data regarding the usage of the information handling system; and other user's usage of other information handling systems.

19. The computer program product of claim 17, wherein the step of adjusting one or more settings of the information handling system comprises:

setting one or more base optimization importance levels based, at least in part, on the user persona; and modifying the one or more base optimization importance levels based, at least in part, on a dynamic context of the one or more processes to generate a persona effect importance model, wherein the one or more settings for the one or more processes is based, at least in part, on the persona effect importance model.

20. The computer program product of claim 17, wherein the medium further comprises code for performing steps comprising:

monitoring one or more performance parameters of the information handling system following the adjustment of the one or more settings of the information handling system associated with a first process; and adjusting the one or more settings of the information handling system based on feedback from monitoring the one or more performance parameters.

* * * * *